(12) United States Patent
Murayama

(10) Patent No.: US 9,898,239 B2
(45) Date of Patent: Feb. 20, 2018

(54) PRINT CONTROL DEVICE AND CONTROL METHOD FOR PRINT CONTROL DEVICE FOR COMMUNICATING WITH HOST DEVICES BY MULTIPLE COMMUNICATION STANDARDS

(71) Applicant: Seiko Epson Corporation, Tokyo (JP)

(72) Inventor: Noriaki Murayama, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 114 days.

(21) Appl. No.: 14/691,334

(22) Filed: Apr. 20, 2015

(65) Prior Publication Data

US 2015/0324149 A1    Nov. 12, 2015

(30) Foreign Application Priority Data

May 8, 2014    (JP) .................. 2014-096557

(51) Int. Cl.
*G06F 3/12* (2006.01)
(52) U.S. Cl.
CPC .......... *G06F 3/1297* (2013.01); *G06F 3/1204* (2013.01); *G06F 3/1234* (2013.01); *G06F 3/1236* (2013.01); *G06F 3/1296* (2013.01)
(58) Field of Classification Search
CPC ... H04N 2201/0044; H04N 2201/0015; H04N 2201/0027; H04N 2201/002; H04N 2201/0022; H04N 1/00307; H04N 1/32786; H04N 1/32793; H04N 1/333; H04N 1/327; H04N 1/32789; H04N 2201/0041; H04N 2201/0049; H04N 2201/0055; H04N 2201/0036; G06F 3/1292; G06F 3/1236; G06F 3/1204; G06F 3/1207; G06F 3/1229; G06F 3/1259; G06F 3/1284

See application file for complete search history.

(56) References Cited

U.S. PATENT DOCUMENTS 7,305,511 B2 * 12/2007 Barrett, Jr. .......... G06F 13/4022
370/365
7,568,031 B2 * 7/2009 Tanimoto .............. G06F 3/1209
358/1.15

(Continued)

FOREIGN PATENT DOCUMENTS

JP    2003-224568 A    8/2003
JP    2007-79924 A    3/2007

(Continued)

*Primary Examiner* — Hai Phan
*Assistant Examiner* — Jonathan R Beckley
(74) *Attorney, Agent, or Firm* — ALG Intellectual Property, LLC

(57) ABSTRACT

A print control device includes: a first communication unit which communicates with a host device via a first communication standard; a second communication unit which communicates with a host device via a second communication standard that is different from the first communication standard; and a control unit which carries out communication control with the host device and print control, wherein the control unit turns a connection with the host device through the first communication unit into a disconnected state when data is received via the first communication standard during print control based on a print job received via the second communication standard.

5 Claims, 7 Drawing Sheets

(56) References Cited

U.S. PATENT DOCUMENTS

| | | | | |
|---|---|---|---|---|
| 8,085,413 B2* | 12/2011 | Yamada | G06F 3/1204 | 358/1.1 |
| 8,866,916 B2* | 10/2014 | Yokota | H04N 1/00278 | 348/207.2 |
| 8,885,200 B2* | 11/2014 | Yoshioka | H04N 1/00888 | 358/1.13 |
| 8,958,100 B2* | 2/2015 | Nishikawa | H04W 4/008 | 358/1.14 |
| 9,007,640 B2* | 4/2015 | Kishimoto | H04N 1/00233 | 358/1.14 |
| 9,100,774 B2* | 8/2015 | Suzuki | H04W 4/008 | |
| 2005/0113025 A1* | 5/2005 | Akamatsu | H04N 1/00278 | 455/41.3 |
| 2007/0011679 A1* | 1/2007 | Abe | G06F 11/3013 | 718/100 |
| 2008/0030754 A1* | 2/2008 | Masumoto | H04N 1/32502 | 358/1.9 |
| 2013/0094047 A1* | 4/2013 | Bailey | H04L 63/18 | 358/1.14 |
| 2013/0107318 A1* | 5/2013 | Yamada | G06F 3/1207 | 358/1.15 |
| 2013/0229685 A1* | 9/2013 | Naruse | G06F 3/1207 | 358/1.15 |
| 2013/0260818 A1* | 10/2013 | Suzuki | H04W 88/06 | 455/552.1 |
| 2014/0139862 A1* | 5/2014 | Gha | G06F 3/1221 | 358/1.13 |
| 2014/0240782 A1* | 8/2014 | Terashita | G06F 3/1203 | 358/1.15 |
| 2015/0092601 A1* | 4/2015 | Ando | H04W 12/06 | 370/254 |
| 2015/0092607 A1* | 4/2015 | Ando | H04W 76/025 | 370/255 |
| 2015/0153978 A1* | 6/2015 | Ito | G06F 3/1236 | 358/1.15 |

FOREIGN PATENT DOCUMENTS

| | | |
|---|---|---|
| JP | 2007-233974 A | 9/2007 |
| JP | 2013-233720 A | 11/2013 |

* cited by examiner

PRINT CONTROL DEVICE AND CONTROL METHOD FOR PRINT CONTROL DEVICE FOR COMMUNICATING WITH HOST DEVICES BY MULTIPLE COMMUNICATION STANDARDS

CROSS-REFERENCE TO RELATED APPLICATION

The entire disclosure of Japanese Patent Application No. 2014-096557, filed May 8, 2014 is expressly incorporated by reference herein.

BACKGROUND

1. Technical Field

The present invention relates to a print control device capable of communicating with a host device via a plurality of types of communication standards, and a control method for a print control device.

2. Related Art

According to the related art, a printing device having a wired communication unit and a wireless communication unit is configured in such a way that data is not received via wireless communication during print control based on a print job received via wired communication, in order to reduce hardware resources such as a reception buffer. Therefore, there is a problem that, during print control based on a print job received via wired communication, even if a host device connected via wireless communication is trying to grasp the state of the printing device, connection is physically impossible and the host device cannot grasp the state. Thus, JP-A-2007-79924 is proposed as a method for solving this problem. JP-A-2007-79924 discloses a configuration in which wireless communication is permitted during print control based on a print job received via wired communication so as to transmit the state of a printing device to a host device via wireless communication, whereas reception of a print job from the host device is rejected. This configuration enables the host device to be notified of the state of the printing device even during print control based on a print job received via wired communication.

Meanwhile, as another problem of the printing device having a wired communication unit and a wireless communication unit, in the case where a specific device such as a smartphone is used as a host device, Bluetooth connection cannot be made from an application thereon (dedicated application for utilizing the printing device). For example, in the case of a printing device capable of USB communication and Bluetooth (trademark registered) communication, the connection of Bluetooth communication needs to be in a disconnected state when print control is carried out on the basis of a print job received from a first host device via USB communication. Therefore, when the printing of a print job received from a second host device is started after the printing of the print job received from the first host device is finished, the user must manually carry out a Bluetooth connection operation from the OS setting of the second host device (smartphone). This is inconvenient. Also, in the case where printing device experiences an error and turns into a power-off state because of a certain trouble, a Bluetooth connection operation must be carried out similarly after the cancelation of the error. Again, this is inconvenient.

SUMMARY

An advantage of some aspects of the invention is to provide a print control device and a control method for a print control device which enable reduction in the time and effort for connection restoration by the user, with a configuration capable of communicating with a host device via a plurality of types of communication standards.

A print control device according to an aspect of the invention includes: a first communication unit which communicates with a host device via a first communication standard; a second communication unit which communicates with a host device via a second communication standard that is different from the first communication standard; and a control unit which carries out communication control with the host device and print control. The control unit turns a connection with the host device through the first communication unit into a disconnected state when data is received via the first communication standard during print control based on a print job received via the second communication standard.

A control method for a print control device according to another aspect of the invention is a control method for a print control device having a first communication unit which communicates with a host device via a first communication standard and a second communication unit which communicates with a host device via a second communication standard that is different from the first communication standard, including turning a connection with the host device through the first communication unit into a disconnected state when data is received via the first communication standard during print control based on a print job received via the second communication standard.

According to these configurations, in the case where data is received via the first communication standard during print control based on a print job received via the second communication standard, the connection of the first communication is turned into a disconnected state at the time. In the case where data is not received via the first communication standard during print control based on a print job received via the second communication standard, the first communication unit is not turned into a disconnected state. That is, compared with the related-art configuration, the opportunities of restoring the connection with the host device through the first communication unit are reduced and the time and effort of the user can be reduced accordingly.

The first communication standard and the second communication standard are assumed to be different communication standards (communication protocols), regardless of wired or wireless communication.

The host device connected through the first communication unit and the host device connected through the second communication unit may be the same host device or different host devices.

The terms "during print control based on a print job received via the second communication standard" may or may not include a period when a print job is received.

The print control device may further include a connection information acquisition unit which acquires connection information for connecting with the host device through the first communication unit. The control unit may restore the connection with the host device through the first communication unit that is in the disconnected state, on the basis of the acquired connection information, after the print control based on the print job received via the second communication standard is finished.

According to this configuration, since the connection of the first communication unit that is in the disconnected state is restored on the basis of the acquired connection information after the print control based on the second communication standard is finished, the time and effort for connection restoration by the user is not needed.

The print control device may further include an error detection unit which detects occurrence of a trouble that requires power-off, and a connection information recording unit which records the acquired connection information in a non-volatile storage unit when the occurrence of the trouble is detected. The control unit may restore the connection with the host device through the first communication unit that is in the disconnected state due to the power-off, on the basis of the connection information recorded in the non-volatile storage unit when the power is turned on.

According to this configuration, even in the case where the power is turned off due to the occurrence of a trouble, the connection of the first communication unit that is in the disconnected state is restored on the basis of the connection information recorded in the non-volatile recording unit. Therefore, the time and effort for connection restoration by the user is not needed.

In the print control device, the first communication standard may be Bluetooth (trademark registered).

According to this configuration, the time and effort for a Bluetooth connection operation from the OS setting can be reduced in the case where the device is connected with a host device (smartphone or the like) having a configuration that cannot make a Bluetooth connection from an application thereon.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a print control device and a control method for a print control device according to the invention will be described with reference to the accompanying drawings. In this embodiment, the case where the print control device according to the invention is applied to a tape printing device that performs printing on a tape-like member (hereinafter referred to as a "print tape") so as to prepare a label will be illustrated.

Figure 1:
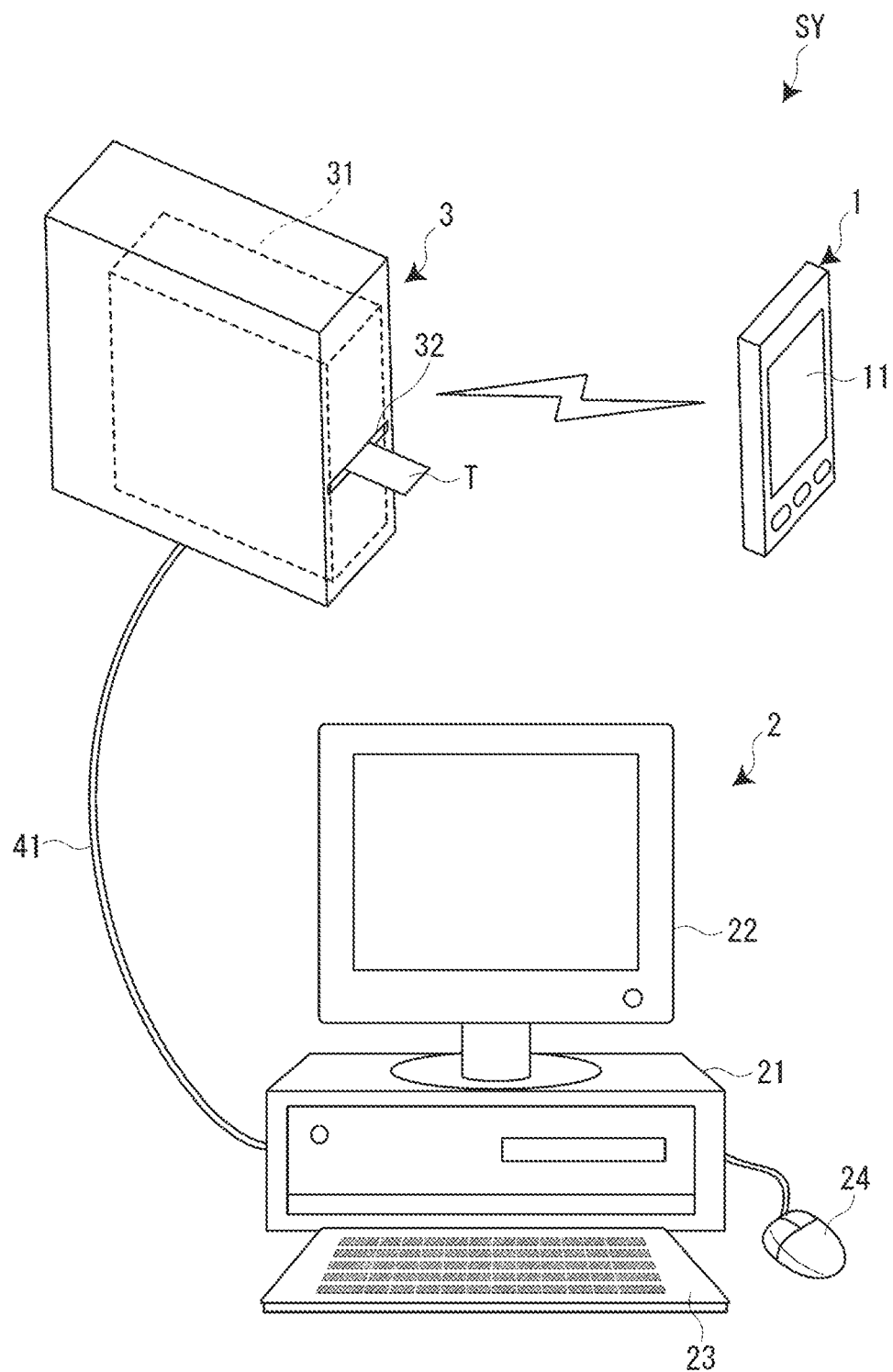
FIG. 1 shows the configuration of a print system according to an embodiment of the invention.

FIG. 1 shows the configuration of a print system SY according to an embodiment of the invention. As shown in FIG. 1, the print system SY includes a mobile terminal 1 that is a first host device, a PC (personal computer) 2 that is a second host device, and a tape printing device 3 used as it is connected with the mobile terminal 1 and the PC 2.

The mobile terminal 1 is realized by an information terminal such as various kinds of tablet terminals or mobile phone. In FIG. 1, an example where a smartphone equipped with a touch panel 11 is used as the mobile terminal 1 is shown. The mobile terminal 1 communicates with the tape printing device 3 via Bluetooth communication (first communication standard).

The PC 2 has the configuration of a typical computer including a PC main body 21, a display 22, a keyboard 23, a mouse 24 and the like. The PC 2 communicates with the tape printing device 3 via USB communication (second communication standard) through a USB cable 41.

In the tape printing device 3, a tape cartridge 31 having an elongate print tape T and an ink ribbon accommodated therein in a wound state is loaded. The tape cartridge 31 is loaded as a cover is opened, not shown. After the loading, the cover is closed. When a print job is received from the mobile terminal 1 or the PC 2 after the tape cartridge 31 is loaded, the tape printing device 3 carries out print processing and cutting processing while reeling off the print tape T from the tape cartridge 31. A printed part of the print tape T, after the cutting processing, is discharged from a tape discharge port 32 and used as a label. The "print job" is a concept including various commands (cut command, tape feed command, or the like) involved in printing, as well as print data to be printed on a label.

Figure 2:
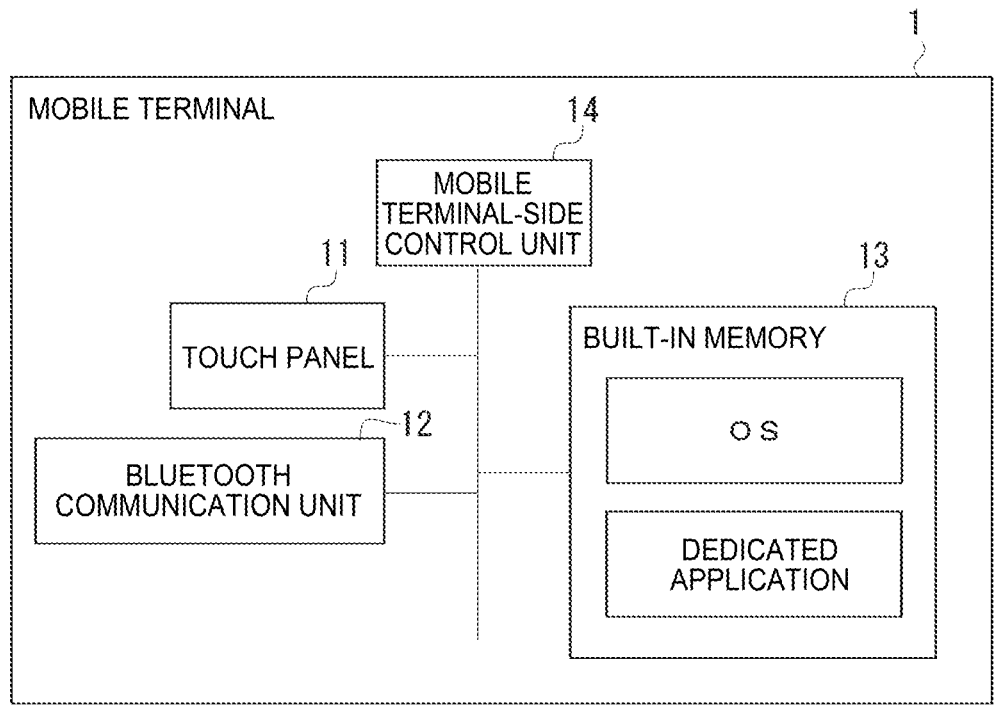
FIG. 2 is a block diagram of a mobile terminal.

Next, the functional configurations of the mobile terminal 1, the PC 2 and the tape printing device 3 will be described with reference to FIGS. 2 to 4. FIG. 2 is a block diagram of the mobile terminal 1. The mobile terminal 1 has a touch panel 11, a Bluetooth communication unit 12, a built-in memory 13, and a mobile terminal-side control unit 14, as the main components thereof.

The touch panel 11 functions as a display unit and an operation unit. In this embodiment, the touch panel 11 is used to edit print data to be printed on a label, or to give a print instruction. The Bluetooth communication unit 12 carries out pairing processing with the tape printing device 3 and thus establishes a connection thereto, and subsequently carries out wireless communication on the basis of the Bluetooth communication standard.

The built-in memory 13 is realized, for example, by a flash ROM (trademark registered) and stores an OS (operating system) and a dedicated application. The dedicated application is an application for smartphone or the like for controlling the tape printing device 3, and causes the touch panel 11 to display an operation screen for editing print data or for giving a print instruction. According to the specifications thereof, the mobile terminal 1 cannot establish a Bluetooth connection from the dedicated application and is instead configured in such a way that the user manually carries out a connection operation from the OS setting.

The mobile terminal-side control unit 14 is realized by a CPU (central processing unit) and a RAM (random access memory), and carries out print job generation processing and communication control with the tape printing device 3, in cooperation with each of the foregoing units (reference numbers 11 to 13).

Figure 3:
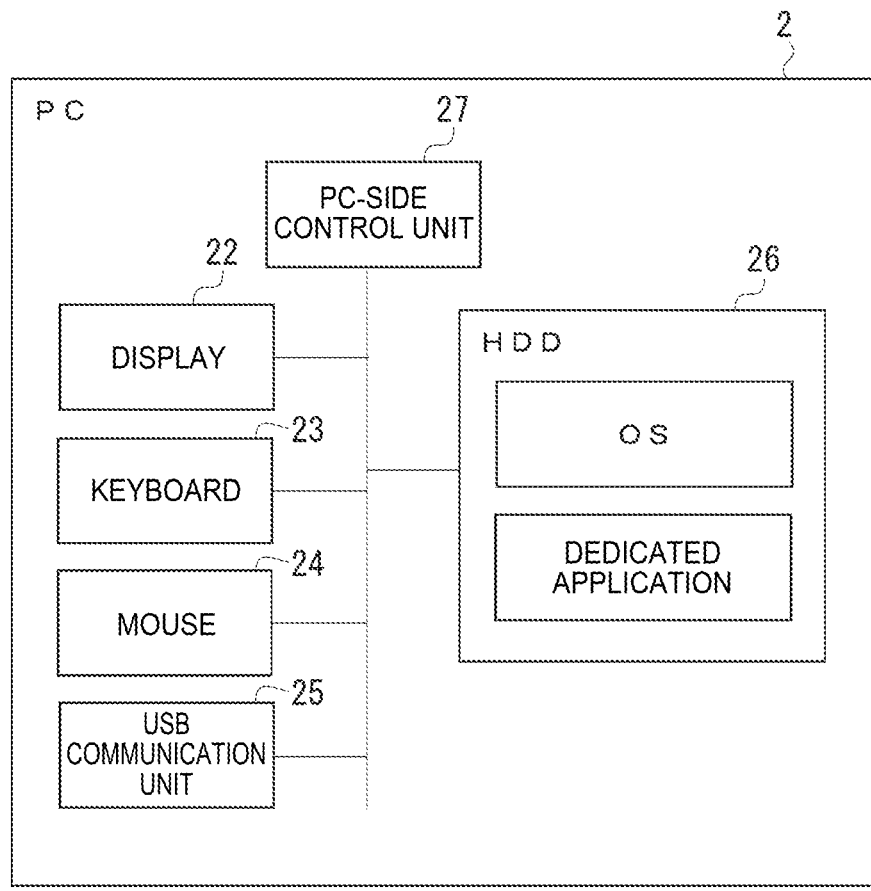
FIG. 3 is a block diagram of a PC.

FIG. 3 is a block diagram of the PC 2. The PC 2 has a USB communication unit 25 and an HDD (hard disk drive) 26 in addition to the display 22, the keyboard 23 and the mouse 24 shown in FIG. 1, as the main components thereof.

The display 22, the keyboard 23 and the mouse 24 are mainly used to edit print data to be printed on a label, or to give a print instruction. The USB communication unit 25 carries out wired communication with the tape printing device 3 on the basis of the USB communication standard.

The HDD 26 stores an OS and a dedicated application. The dedicated application is an application for PC for controlling the tape printing device 3, and causes the display 22 to display an operation screen for editing print data and for giving a print instruction.

A PC-side control unit 27 is realized by a CPU and a RAM and carries out print job generation processing and communication control with the tape printing device 3 in cooperation with each of the foregoing units (reference numbers 22 to 26).

Figure 4:
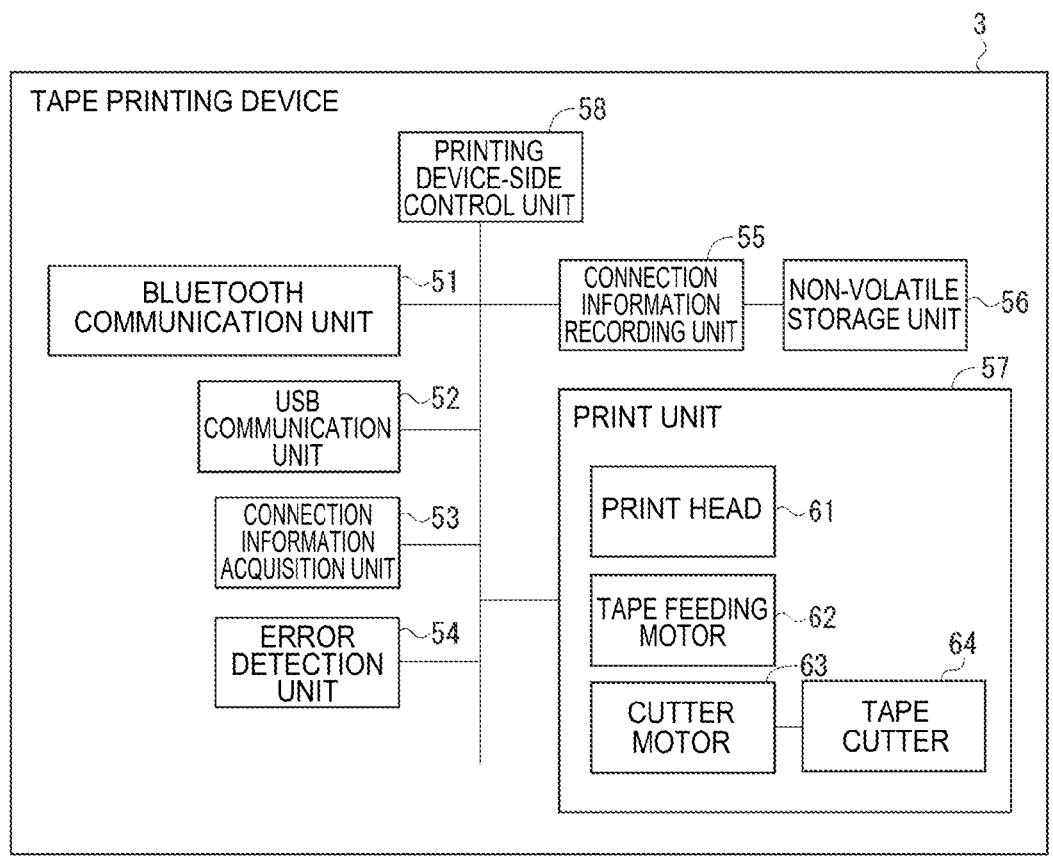
FIG. 4 is a block diagram of a tape printing device.

FIG. 4 is a block diagram of the tape printing device 3. The tape printing device 3 has a Bluetooth communication unit 51 (first communication unit), a USB communication unit (second communication unit), a connection information acquisition unit 53, an error detection unit 54, a connection information recording unit 55, a non-volatile storage unit 56, a print unit 57, and a printing device-side control unit 58 (control unit), as the main components thereof. The "print control device" in the appended claims is equivalent to the other components than the print unit 57, of these units.

The Bluetooth communication unit 51 communicates with the mobile terminal 1 via Bluetooth communication. The USB communication unit 52 communicates with the PC 2 via USB communication. The connection information acquisition unit 53 acquires connection information for connecting with the host device (mobile terminal 1) through the Bluetooth communication unit 51. The "connection information" refers to a BD address (address for identifying a Bluetooth-conforming device) and a link key (key for identifying the pairing counterpart).

The error detection unit 54 detects the occurrence of a trouble that requires power-off of the tape printing device 3. The "trouble that requires power-off" refers to, for example, the absence of a tape (non-loading of the tape cartridge 31, shortage of the remaining tape, or the like), overheating of a print head 61, fall of power-supply voltage, opening of the cover of the tape cartridge 31, or the occurrence of an abnormality in a tape feeding motor 62 or a cutter motor 63, and the like.

The connection information recording unit 55 records the connection information acquired by the connection information acquisition unit 53 into the non-volatile storage unit 56 when the occurrence of a "trouble that requires power-off" is detected by the error detection unit 54. The non-volatile storage unit 56 is realized, for example, by a flash ROM.

The print unit 57 includes a print head 61, a tape feeding motor 62, a cutter motor 63, and a tape cutter 64. The print head 61 is a thermal head and performs printing, holding the print tape T and the ink ribbon that are reeled off, between the print head 61 and a platen roller (not shown). The tape feeding motor 62 carries the print tape T that is reeled off, from the print head 61 toward the tape discharge port 32 (see FIG. 1). The cutter motor 63 drives the tape cutter 64 to cut the printed part of the print tape T in the direction of tape width in the state where the tape feeding is temporarily stopped.

The printing device-side control unit 58 is realized by a CPU and a RAM and carries out communication control with the mobile terminal 1 and the PC 2 and print control, in cooperation with each of the foregoing units (reference numbers 51 to 57). The connection information acquired by the connection information acquisition unit 53 is temporarily saved in the RAM after the acquisition. When a "trouble that requires power-off" occurs, the connection information is read out from the RAM and recorded in the non-volatile storage unit 56.

The printing device-side control unit 58 also includes a receiving buffer that temporarily stores a print job. The tape printing device 3 of this embodiment is configured not to receive data via Bluetooth communication during print control based on a print job received via USB communication, and not to receive data via USB communication during print control based on a print job received via Bluetooth communication, in order to reduce hardware resources such as the receiving buffer. However, in the case of performing print control based on a print job received from the PC 2 via USB communication, the printing device-side control unit 58 turns the connection with the mobile terminal 1 into a disconnected state at the time when data is received from the mobile terminal 1 via Bluetooth communication during print control, instead of turning the connection with the mobile terminal 1 into a disconnected state in advance. That is, in the case where data is not received from the mobile terminal 1 during print control, the connection with the mobile terminal 1 is maintained in the pre-print state.

In the case where data is received via Bluetooth communication during print control based on a print job from the PC 2 and the connection with the mobile terminal 1 is turned into a disconnected state, the printing device-side control unit 58 restores the connection with the mobile terminal 1 on the basis of the connection information acquired in advance by the connection information acquisition unit 53, after the end of the print control. That is, while the two types of communication measures are used exclusively, the destination of communication can be switched without having to carry out a manual Bluetooth connection operation by the user.

Also, in the case where the occurrence of a "trouble that requires power-off" is detected by the error detection unit 54 and therefore the tape printing device 3 is turned into a power-off state, the printing device-side control unit 58 reads out the connection information stored in the non-volatile storage unit 56, triggered by an power-on operation by the user, and restores the connection with the mobile terminal 1 on the basis of the connection information. That is, even in the case where an error occurs, the Bluetooth connection can be re-established without having to carry out a manual Bluetooth connection operation by the user.

Figure 5:
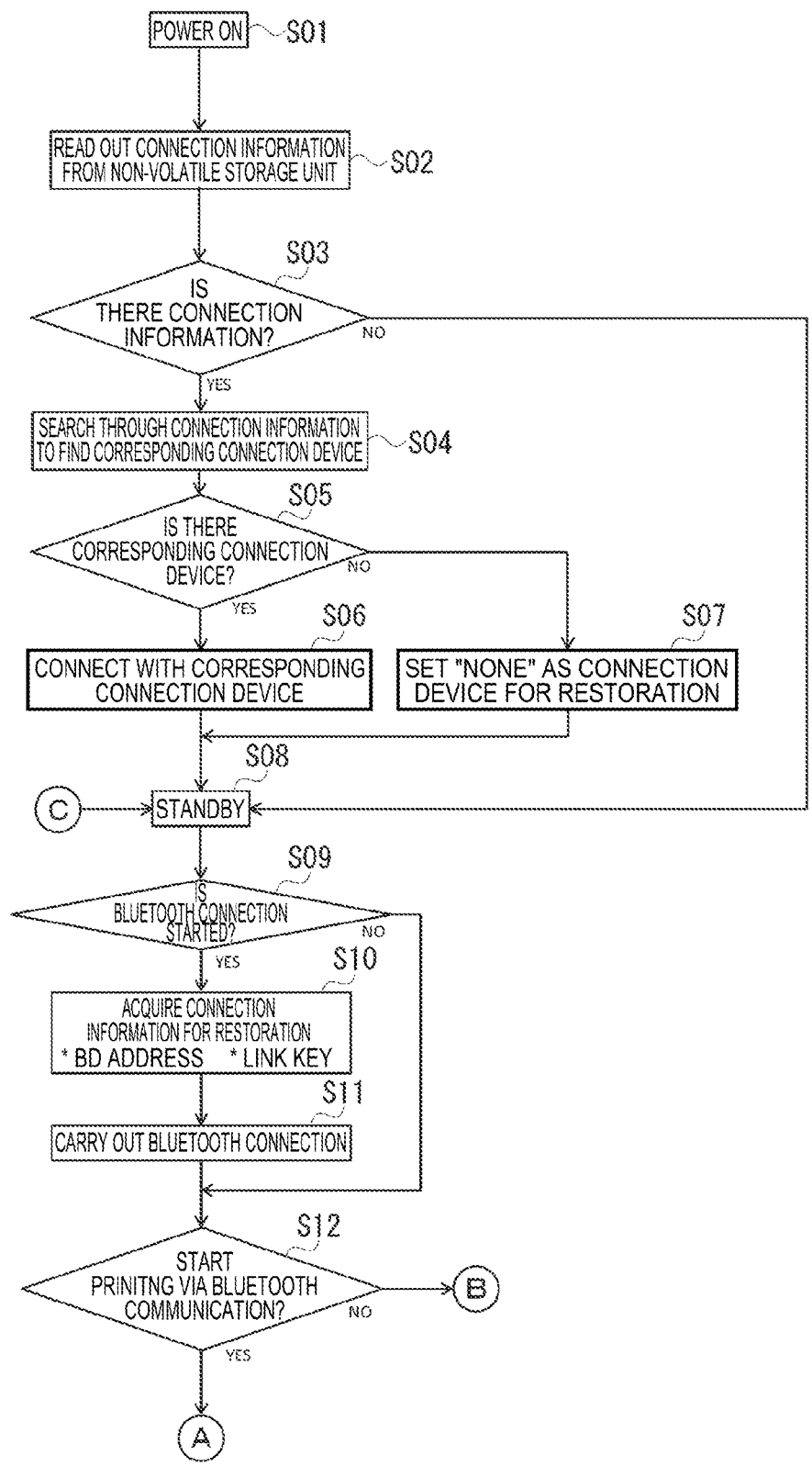
FIG. 5 is a flowchart showing a sequence of processing in the tape printing device.
Figure 6:
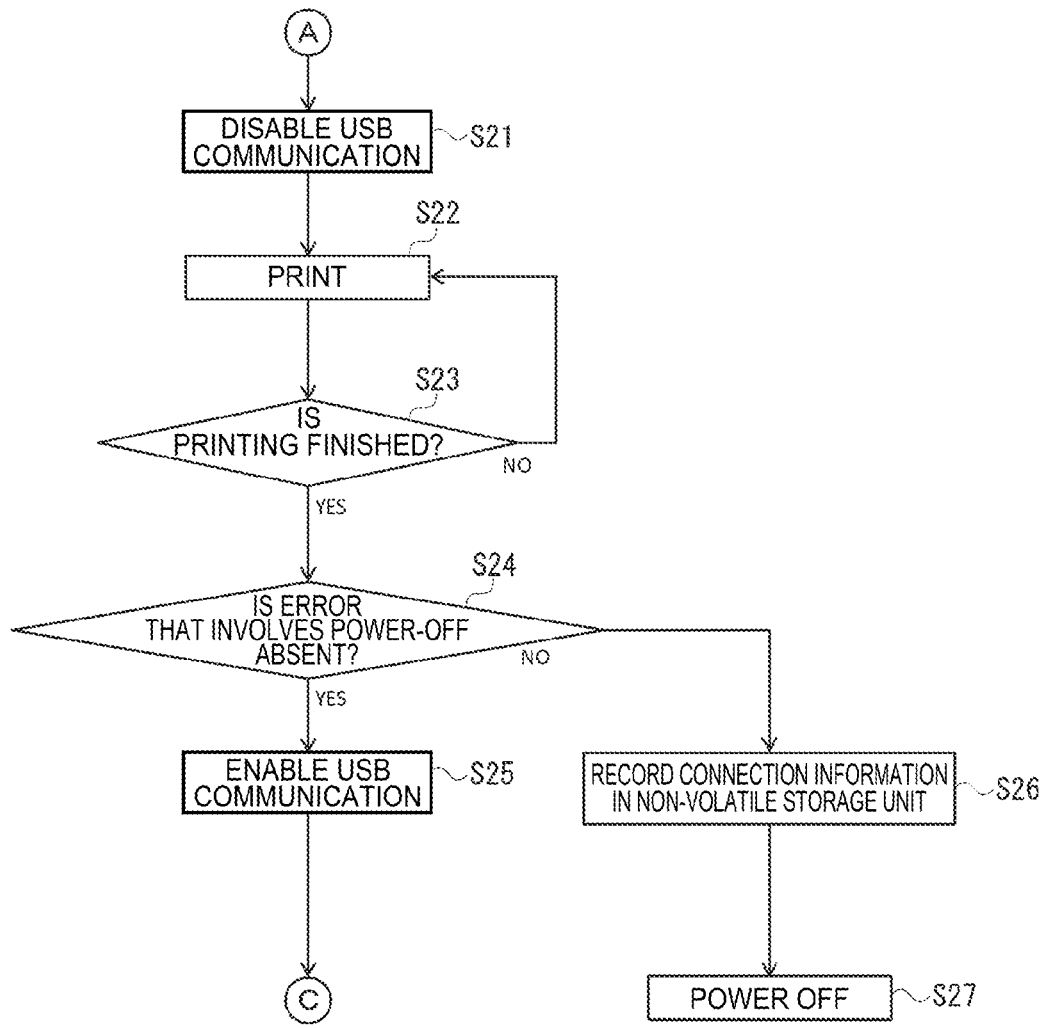
FIG. 6 is a flowchart showing the processing in the tape printing device, continuing from FIG. 5.
Figure 7:
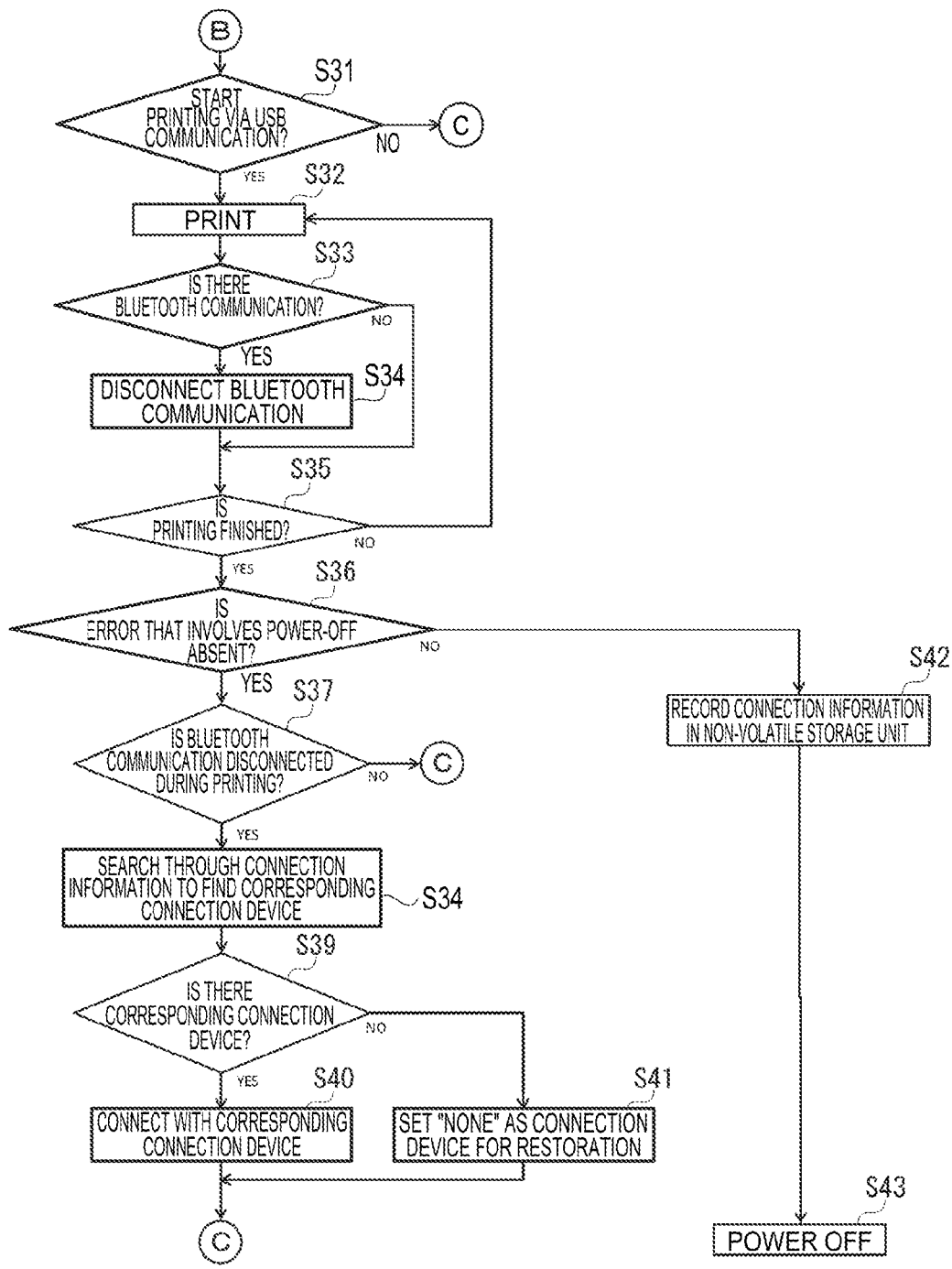
FIG. 7 is a flowchart showing the processing in the tape printing device, continuing from FIG. 5.

Next, the flow of processing by the tape printing device 3 will be described with reference to the flowcharts of FIGS. 5 to 7. As shown in FIG. 5, when the power is turned on (S01), the tape printing device 3 (printing device-side control unit 58) reads out connection information from the non-volatile storage unit 56 (S02). Here, if connection information is stored in the non-volatile storage unit 56 (S03: YES), the corresponding Bluetooth connection device (hereinafter referred to simply as a "connection device") is searched for on the basis of the connection information (S04). If the corresponding connection device exists (S05: YES), a connection with the connection device is decided (S06). If the corresponding connection device does not exist (S05: NO), "NONE" is set as the connection device for restoration (S07).

After S06 and S07, the device enters a standby state waiting for the start of a Bluetooth connection (S08). Here, if a Bluetooth connection is started (S09: YES), connection information for restoring the connection (BD address and link key) is acquired (S10), and the Bluetooth connection is carried out (pairing processing is carried out, S11). After S09: NO or S11, whether a print job is received via Bluetooth communication or not is determined (S12).

Subsequently, if a print job is received from the mobile terminal 1 via Bluetooth communication (S12: YES), the tape printing device 3 disables USB communication (S21) and carries out printing based on the print job received via Bluetooth communication (print control is performed, S22), as shown in FIG. 6. Then, whether the printing based on the print job received via Bluetooth communication is finished or not is determined (S23). If the printing is not finished (S23: NO), the processing returns to S22. If the printing is finished (or if the printing is stopped due to the occurrence of an error, S23: YES), whether an error that involves power-off during print control is absent or not is determined (S24). Here, if an error is absent (S24: YES), USB communication is enabled (S25) and the processing returns to S08 (standby state). If an error that involves power-off is present (S24: NO), the connection information acquired in S10 of FIG. 5 is recorded in the non-volatile storage unit 56 (S26) and the power is turned off (S27).

Meanwhile, if a print job is not received via Bluetooth communication in S12 of FIG. 5 (S12: NO), whether a print job is received via USB communication or not is determined (S31), as shown in FIG. 7. Here, if a print job is received from the PC 2 via USB communication (S31: YES), printing is carried out on the basis of this print job (print control is performed, S32). If a print job is not received via USB communication (S31: NO), the processing returns to S08 of FIG. 5 to enter a standby state.

Subsequently, whether data is received via Bluetooth communication from the mobile terminal 1 or not (whether there is Bluetooth communication or not), during print control based on the print job received via USB communication, is determined (S33). Here, the terms "data is received via Bluetooth communication" may refer not only to reception of a print job but also to reception of other data such as reception of data for checking the state of the tape printing device 3. If data is received via Bluetooth communication during print control (S33: YES), the Bluetooth communication is disconnected at the time (S34). If data is not received via Bluetooth communication during print control (S33: NO), S34 is omitted.

Then, whether the printing based on the print job received via USB communication is finished or not is determined (S35). If the printing is not finished (S35: NO), the processing returns to S32. If the printing is finished (or if the printing is stopped due to the occurrence of an error, S35: YES), whether an error that involves power-off during print control is absent or not is determined (S36). If an error is absent (S36: YES), whether the Bluetooth communication is disconnected during printing or not is determined (S37). If the Bluetooth communication is not disconnected during printing (that is, if data is not received via Bluetooth communication during print control based on the print job received via USB communication, S37: NO), the processing returns to S08 (standby state).

Meanwhile, if the Bluetooth communication is disconnected during printing (that is, if data is received via Bluetooth communication during print control based on the print job received via USB communication, S37: YES), the connection information acquired in S10 of FIG. 5 is searched through to find the corresponding connection device (S38). If the corresponding connection device exists (S39: YES), a connection with the connection device is decided (S40) and the processing returns to S08 (standby state). If the corresponding connection device does not exist (S39: NO), "NONE" is set as the connection device for restoration (S41) and the processing returns to S08. Meanwhile, if an error that involves power-off during print control based on the print job received via USB communication is present (S36: NO), the connection information acquired in S10 of FIG. 5 is recorded in the non-volatile storage unit 56 (S42) and the power is turned off (S43).

As described above, according to the embodiment, the tape printing device 3 that has a USB communication unit and a Bluetooth communication unit and uses these units exclusively is configured to disconnect Bluetooth communication at the time when data is received via Bluetooth communication during printing of a print job received via USB communication, instead of disconnecting Bluetooth communication with the start of printing of a print job received via USB communication. Therefore, unwanted disconnection of Bluetooth communication can be prevented. Also, in the case where Bluetooth communication is disconnected, the connection of Bluetooth communication is restored on the basis of the connection information that is acquired in advance, after the printing of the print job received via USB communication is finished. Therefore, no inconvenience is caused to the user. Moreover, even in the case where the power is turned off because of the occurrence of a trouble, Bluetooth communication that is in a disconnected state is restored on the basis of the connection information recorded in the non-volatile storage unit 56. Therefore, no inconvenience is caused to the user.

In the embodiment, Bluetooth communication is disconnected at the time when data is received via Bluetooth communication during printing of a print job received via USB communication. However, Bluetooth communication may be disconnected with the start of printing via USB communication, as in the related-art configuration. In this case, after the printing of the print job received via USB communication is finished, the corresponding connection device may be searched for on the basis of the connection information that is acquired in advance. That is, after S31: YES of FIG. 7, S34 may be executed, and after S35: YES and S36: YES, S38 and onward may be executed, omitting S37.

In the embodiment, the tape printing device 3 that supports Bluetooth communication (first communication standard) and USB communication (second communication standard) is illustrated. However, the embodiment may be applied to a tape printing device 3 that supports other communication standards. In the case where wired communication and wireless communication can be supported, it is preferable that wireless communication is applied to the first communication standard and that wired communication is applied to the second communication standard. Also, the embodiment may be applied to a tape printing device 3 that supports a plurality of wired communication or a plurality of wireless communication. Moreover, the communication standards that can be supported are not limited to two types but may be three or more types.

In the embodiment, the tape printing device 3 communicates with the mobile terminal 1 via Bluetooth communication and communicates with the PC 2 via USB communication. However, the embodiment can also be applied to the case of communicating with the same host device via a plurality of types of communication standards. For example, the embodiment may be applied to the case of processing a status command received from the PC 2 via Bluetooth communication during processing of a print job received from the PC 2 via USB communication. In this case, the PC 2 (host device) may be configured to be able to simultaneously start up a plurality of applications that can control the tape printing device 3.

In the embodiment, the tape printing device 3 is illustrated as an example of a device to which the print control device is applied. However, the print medium is not limited to this example. The embodiment can also be applied to a printing device using a print medium that is cut in advance, such as a sheet of copy paper or postcard (printing device without having a cutting function). Also, the embodiment may be applied to a print control device (interface board or the like) that is separate from a printing device and can be connected to or loaded in the printing device.

Each component of the print system SY described in the embodiment may be provided as a program. The program may be stored in various recording media (CD-ROM, flash memory and the like) and provided as such. That is, a program for causing a computer to function as each component of the mobile terminal 1, the PC 2 and the tape printing device 3, and a recording medium in which the program is recorded, are included in the scope of the invention. Also, various modifications can be made according to need without departing from the scope of the invention.

What is claimed is:

1. A print control device comprising:
    a first communication unit which communicates with a first host device via a first communication standard, the first communication standard comprising BLUETOOTH;
    a second communication unit which communicates with a second host device via a second communication standard that is different from the first communication standard; and
    a control unit which is composed in a tape printing device and carries out communication control with the first host device and the second host device and performs tape print control,
    wherein the control unit
        maintains an established physical BLUETOOTH connection with the first host device through the first communication unit in a connected state, and
        turns the established physical BLUETOOTH connection into a disconnected state when data comprising at least one of a print job and data for checking a state of the print control device is received through the first communication unit from the first host device via the first communication standard during tape print control based on another print job received through the second communication unit from the second host device via the second communication standard, the disconnected state being a state without a physical BLUETOOTH connection with the first host device through the first communication unit.

2. The print control device according to claim 1, further comprising a connection information acquisition unit which acquires connection information for connecting with the first host device through the first communication unit,
    wherein the control unit restores the physical BLUETOOTH connection with the first host device through the first communication unit that is in the disconnected state, on the basis of the connection information that is acquired by the connection information acquisition unit, after termination of the tape print control based on the another print job received through the second communication unit from the second host device via the second communication standard.

3. The print control device according to claim 2, further comprising:
    an error detection unit which detects occurrence of a trouble that requires power-off; and
    a connection information recording unit which records the acquired connection information in a non-volatile storage unit when the occurrence of the trouble that requires power-off is detected,
    wherein the control unit restores the physical BLUETOOTH connection with the first host device through the first communication unit that is in the disconnected state due to the power-off, on the basis of the connection information recorded in the non-volatile storage unit when the power is turned on.

4. A control method for a print control device having a first communication unit which communicates with a first host device via a first communication standard and a second communication unit which communicates with a second host device via a second communication standard that is different from the first communication standard, the method comprising:
    maintaining an established physical BLUETOOTH connection with the first host device through the first communication unit in a connected state, and
    turning the established connection into a disconnected state when data comprising at least one of a print job and data for checking a state of the print control device is received through the first communication unit from the first host device via the first communication standard during print control based on a print job received through the second communication unit from the second host device via the second communication standard, the disconnected state being a state without a physical BLUETOOTH connection with the first host device through the first communication unit,
    wherein the first communication standard comprises BLUETOOTH.

5. A tape printing device comprising:
    a print unit that performs printing on a print tape accommodated in a tape cartridge loaded in the tape printing device;
    a first communication unit which communicates with one or more host devices via a first communication standard, the first communication standard comprising BLUETOOTH;
    a second communication unit which communicates with the one or more host devices via a second communication standard that is different from the first communication standard; and
    a control unit which carries out communication control with the one or more host devices and performs tape print control,
    wherein the control unit
        maintains an established physical BLUETOOTH connection with the one or more host devices through the first communication unit in a connected state, and
        turns the established physical BLUETOOTH connection into a disconnected state when data comprising at least one of a print job and data for checking a state of the tape printing device is received through the first communication unit via the first communication standard during tape print control based on another print job received through the second communication unit via the second communication standard, the disconnected state being a state without a physical BLUETOOTH connection with the first host device through the first communication unit.

* * * * *